(12) United States Patent
Uhl

(10) Patent No.: US 7,113,176 B2
(45) Date of Patent: Sep. 26, 2006

(54) VIDEO IMAGE CAPTURE SYSTEM WITH ADJUSTABLE CONTROL SCREEN

(75) Inventor: Steve B. Uhl, Los Gatos, CA (US)

(73) Assignee: Stryker Corporation, Kalamazoo, MI (US)

( * ) Notice: Subject to any disclaimer, the term of this patent is extended or adjusted under 35 U.S.C. 154(b) by 730 days.

(21) Appl. No.: 10/060,473

(22) Filed: Jan. 30, 2002

(65) Prior Publication Data

US 2003/0142080 A1 Jul. 31, 2003

(51) Int. Cl.
*G09G 3/00* (2006.01)
*G09F 1/16* (2006.01)

(52) U.S. Cl. ...................................... 345/173; 361/681
(58) Field of Classification Search ................. 345/173, 345/177, 178; 361/681, 682, 683, 686
See application file for complete search history.

(56) References Cited

U.S. PATENT DOCUMENTS

| 5,168,423 | A | | 12/1992 | Ohgami et al. |
| 5,335,142 | A | | 8/1994 | Anderson |
| 5,636,101 | A | * | 6/1997 | Bonsall et al. ............... 361/681 |
| 5,640,296 | A | * | 6/1997 | Bonsall et al. ............... 361/681 |
| 5,652,694 | A | | 7/1997 | Martin |
| 5,668,570 | A | * | 9/1997 | Ditzik ........................ 345/173 |
| 6,627,918 | B1 | * | 9/2003 | Getz et al. ..................... 257/59 |

* cited by examiner

*Primary Examiner*—Amare Mengistu
(74) *Attorney, Agent, or Firm*—Flynn, Thiel, Boutell & Tanis, P.C.

(57) ABSTRACT

An assembly for pivotally mounting a touch screen subassembly (39) to a housing (21). An enclosure (4) containing the touch screen (40) is pivotally mounted to hinge plates (30, 32). Washers (70, 72, 74, 130) and fasteners (76, 131) hold the enclosure to the hinges and apply an intermediate braking force that inhibits movement of the subassembly will the touch screen is normally depressed to actuate one of its buttons and that allows movement when a force is applied to deliberately move the assembly. A lock assembly with a moving latch (84) holds the touch screen subassembly in either the fully inclined or full upright positions when the subassembly is so positioned until a user manually actuates the latch.

20 Claims, 8 Drawing Sheets

VIDEO IMAGE CAPTURE SYSTEM WITH ADJUSTABLE CONTROL SCREEN

FIELD OF THE INVENTION

This invention relates generally to electrically operated surgical/medical devices that are provided with control screens. More particularly, this invention is related to a control console for a surgical/medical device that includes a control screen that can be selectively positioned relative to the rest of the control console.

BACKGROUND OF THE INVENTION

The ability to perform modern surgical procedures is made possible, in part, by the development of increasing advanced electrically controlled and operated surgical equipment. Today, modern electrically operated surgical and medical equipment are able to perform such functions as: precisely regulate mechanically, acoustically, electrically and/or optically actuated surgical instruments; apply and remove both liquid and gaseous state fluids contained within a surgical site; identify where a surgical instrument is within a patient even though the instrument is concealed to the human eye; and/or display and/or record images of the surgical site A common component in each of the foregoing types of surgical equipment is the control console. This control console is typically in the form of a housing in which is contained the circuitry that either controls another component and/or that performs the signal processing function of the equipment. Often, these control consoles are provided with touch screen displays that perform two functions. First, these displays serve as monitors on which information regarding the state of the equipment and/or information gathered by the equipment is presented. Secondly, these displays function as data entry devices through which the surgeon and other medical personnel enter commands and/or data to the equipment. Typically, images of buttons are presented on these displays. The portions of these displays on which the buttons are presented are depressed by the medical personnel to enter the command and/or data. An advantage of these control consoles is that they can be configured so that their touch screens, at any given instant, only present information and/or buttons that are immediate of concern the medical personnel. This prevents the personnel from having to perceive visually presented information that is not relevant to the surgical procedure at hand and that can be potentially distracting.

A disadvantage of present control consoles for surgical/medical devices is that their touch screens are statically mounted to the rest of the console. Consequently, depending where a console is positioned, the medical personnel may have to strain to view the touch screen and/or to depress the buttons presented on it. Sometimes this strain is caused by the physical position of the control console relative to the medical personnel. At other times, this strain, particularly the eyestrain, is due to the fact that light present in the operating room places a glare on the touch screen that may make it difficult to view some of the images presented on the screen.

The above problems may occur with some control consoles because these consoles are often located and relocated in different positions in an operating room. For example, some consoles are seated on carts in the operating room. The position of the console on the cart or the position of the cart itself may change from surgical procedure-to-surgical procedure in order to accommodate for different types of equipment used to perform different surgical procedures and/or the individual equipment placement preferences of the surgeons performing the various procedures. Alternatively, these consoles are sometimes mounted on adjustably positioned booms in an operating room. These booms allow the equipment they hold to be moved both horizontally and vertically. Thus, when the control console is in one position, it may be relatively easy to view and depress its touch screen. However, if it is necessary or desirable to move the control console to an alternative position, the images presented on their touch screens may be difficult to discern and their buttons difficult to depress.

SUMMARY OF THE INVENTION

This invention is related to a new and useful control console for use with surgical/medical equipment. The control console of this invention has a touch screen on which images, including images of user-depressible buttons are presented. The touch screen is part of a subassembly that is pivotally mounted to the housing of the console. A locking assembly is sometimes provided to hold the touch screen in at least one fixed position relative to the housing.

BRIEF DESCRIPTION OF THE DRAWINGS

The invention is pointed out with particularity in the claims. The above and further features and advantages of the invention may be better understood by reference to the following detailed description and the accompanying drawings, in which:

DETAILED DESCRIPTION

Figure 1:
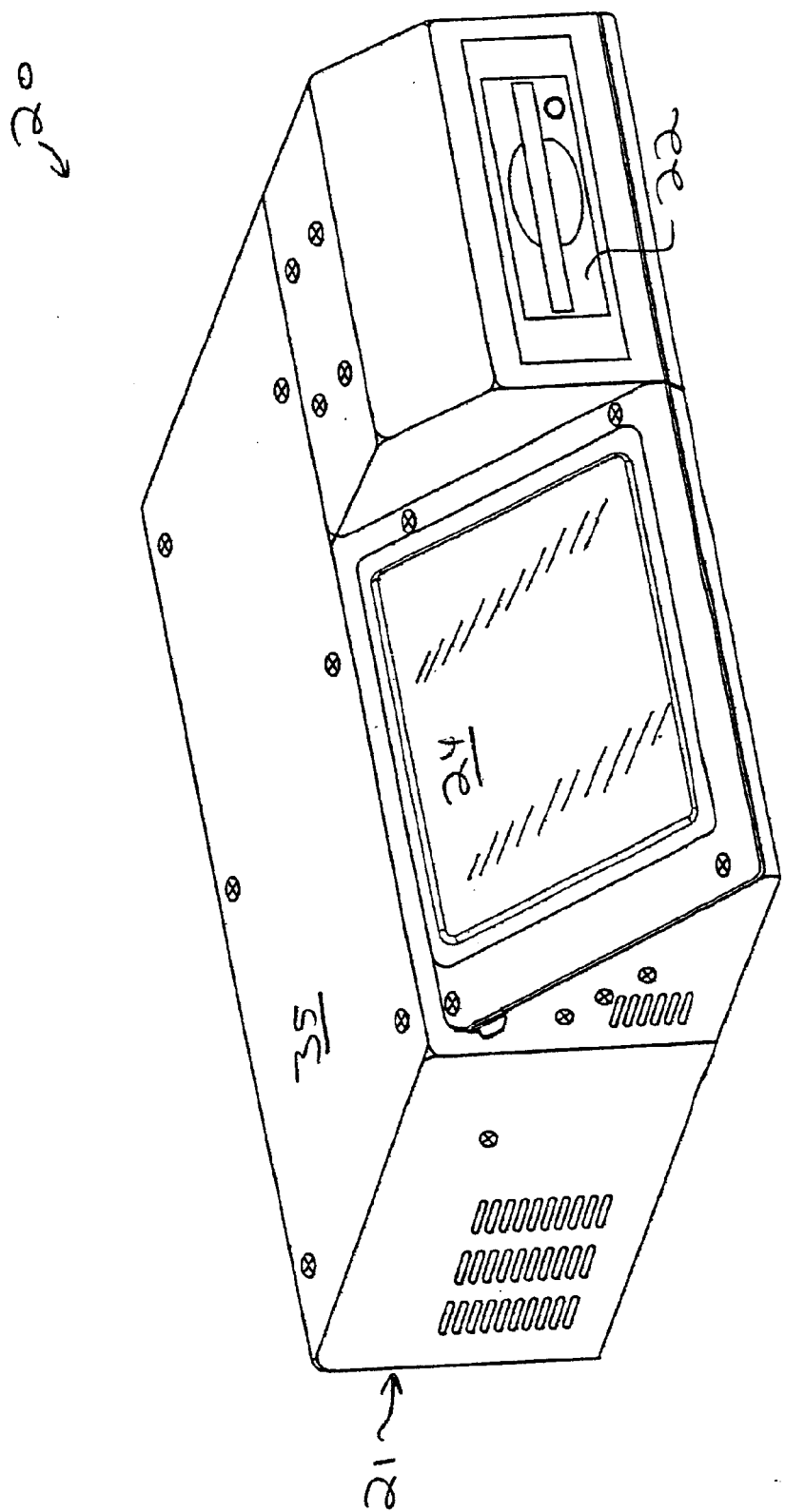
FIG. 1 is a perspective view of a surgical/medical control console, in particular a video image recorder, embodying the features of this invention.
Figure 2:
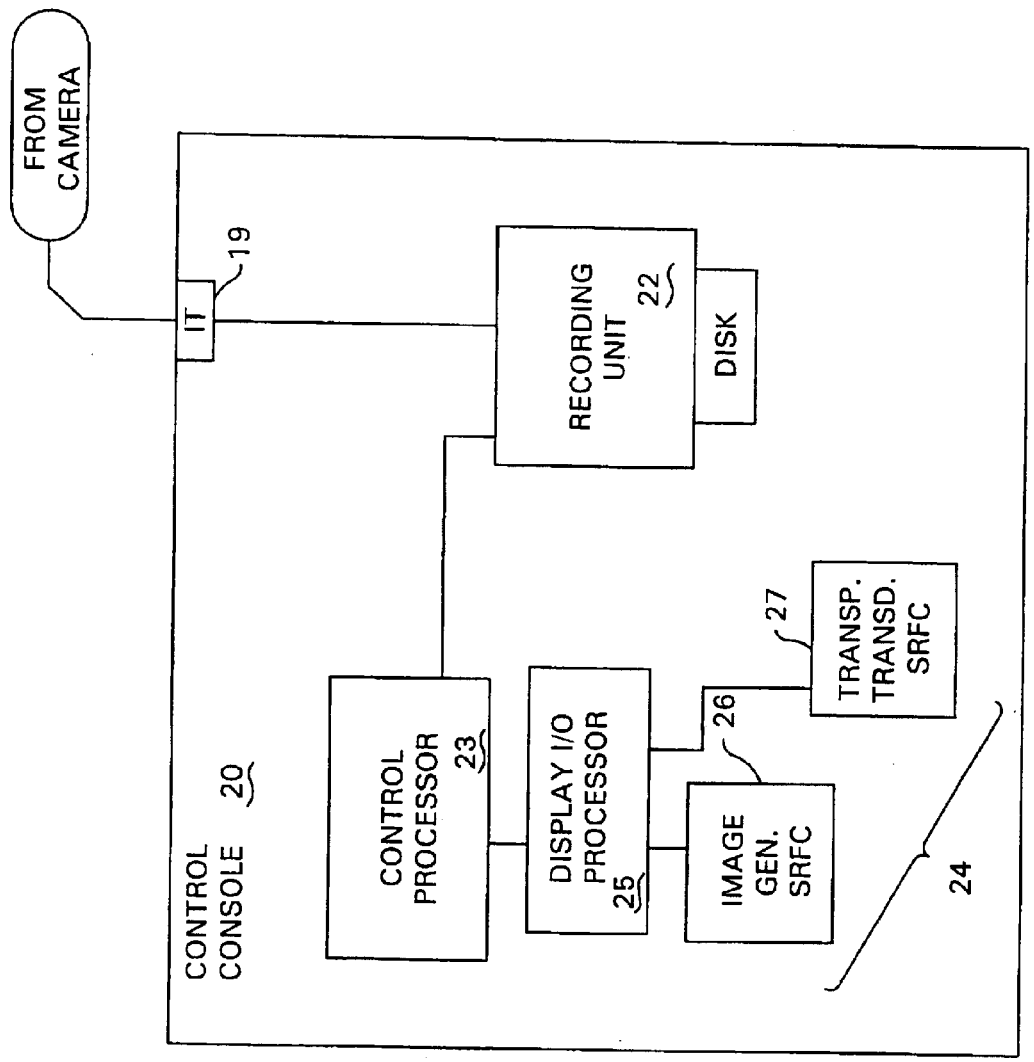
FIG. 2 is a block diagram of the basic components internal to the control console of an exemplary version of the invention.

FIG. 1 illustrates a surgical/medical control console 20 of this invention. The disclosed control console 20 is a video image recorder. Specifically, this control console receives video images from a camera system, not illustrated, and records still or continuous portions of these images on media contained within the console 20 and/or outputs the images to a separate storage file. Control console 20 includes a housing 21 in which its internal components are stored. In the particular control console, these components are the mechanical and electrical components that capture the image-defining signals and electrically record the images on the storage medium. As seen by reference to FIG. 2, these components include a recording unit 22 configured to receive a medium such as a magnetic disk to which electrically readable signals can be written; an input terminal 19 to which video signals from a camera are input; and a control processor 23 that regulates the writing of video signals onto the storage medium by the recording unit.

The Applicant's Assignees U.S. patent application Ser. No. 09/439,632, entitled MULTI-FUNCTION IMAGE AND VIDEO CAPTURE DEVICE FOR USE IN AN ENDOSCOPIC CAMERA SYSTEM, filed Nov. 11, 1999, and incorporated herein by reference, discloses the circuitry of one such image recorded. It should, however, be recognized that alternative control components that perform the same or different functions, may be secured in housing 21.

A touch screen 24 is that, pivotally mounted to the housing 21, is a touch screen display 24. A display input/output (I/O) processor 25 (FIG. 2) serves as interface for an exchange of signals between the control processor 23 and the display 24. Specifically, control processor 23 generates commands indicating what images should be presented on the display 24. The display I/O processor 25, based on these commands, generates display drive signals to the display 24. An image generating screen 26 integral with the display 24, in response to the received display drive signals, generates specific user-viewable images. A touch or heat-sensitive transparent transducer surface circuit 27 disposed over the image generating surface 26 forms the outer surface of the display. Depending on which portion of surface is touched by the user, specific signals are sent by the surface 27 to the display I/O processor 25. The display I/O processor 25 based on thee received signals, then generates command signals back to control processor 23. The control signals regulate the operation of the control console 20.

Figure 3B:
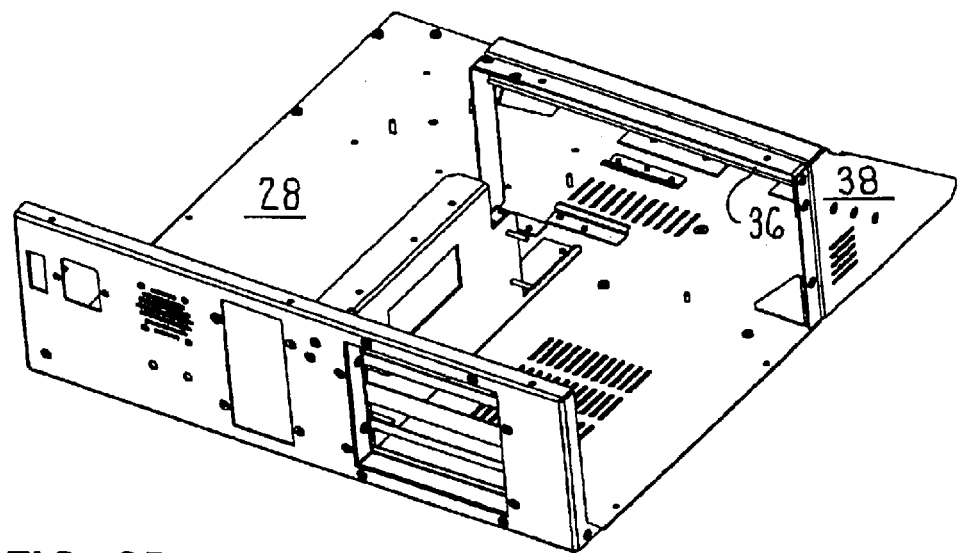
FIGS. 3A and 3B are, respectively, front and rear perspective views of the chassis of the control console.
Figure 3A:
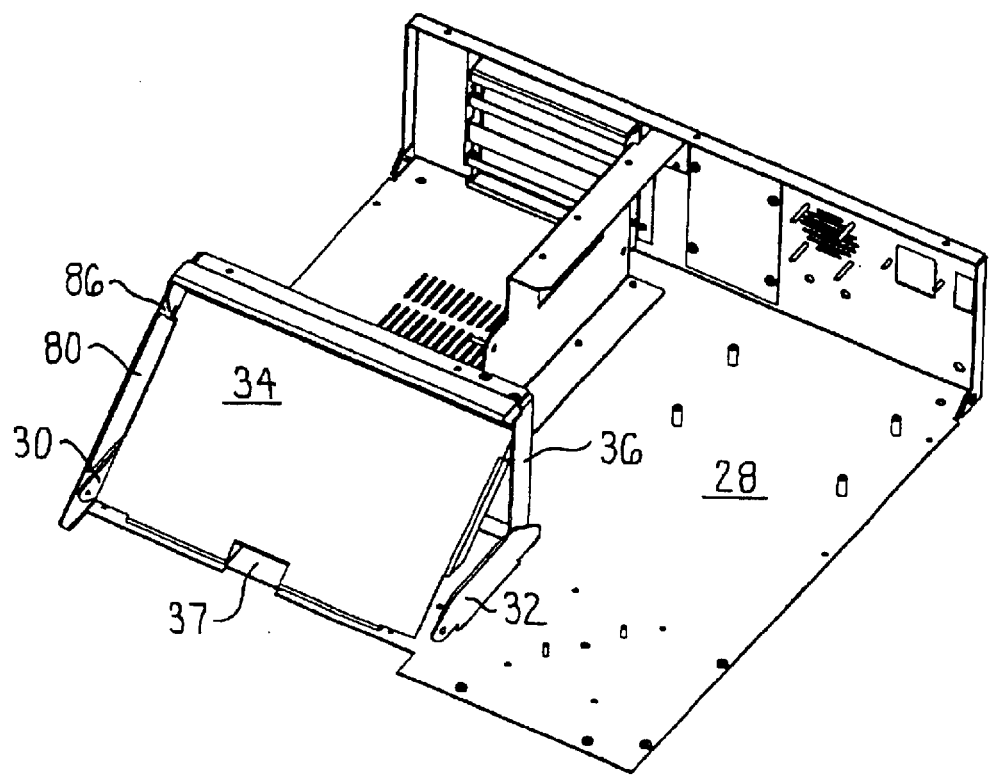

As seen in FIGS. 3A and 3B, the housing 21 includes a generally planar chassis 28. Chassis 28 serves as the basic frame to which substantially all of the components of the console 20 are mounted. Left and right hinges 30 and 32, respectively, are secured to the front of the chassis 28 adjacent the front edge of the chassis. A stop plate 34 is secured to chassis 28 so as to be located between hinges 30 and 32. In some preferred versions of the invention, plate 34 is at an angle of between 25 and 75° relative to the plane of the chassis 28. In more preferred versions, this angle is between 50 and 60°. As discussed hereinafter; hinges 30 and 32 are the members of the housing 21 to which the subassembly that contains the touch screen display 24 is pivotally secured. Stop plate 34 serves as member that restricts rearward inclination of the touch screen display.

The free end on the stop plate 34, the end opposite the end of the plate secured to chassis 28, is secured to a three-sided support bracket 36 that is secured to and extends upwardly from the chassis 28. In the depicted version of the invention, stop plate 34 is formed to define a small rectangular cutout 37 in the center of the plate adjacent chassis 28. Cutout 37 serves as the opening wherein conductors are fed that extend between the touch screen display 24 and the inside of the housing 21, (conductors not illustrated). The conductors serve as the members over which signals are transferred to and from the circuitry internal to the housing and the touch screen display.

A triangularly shaped side plate 38 is located along the left edge of the chassis 28. Side plate 38 is spaced a small distance away from the outwardly facing surface of the left hinge 30. In one method of manufacture, side plate 38 is a section of the planar piece of metal that defines chassis 28. As part of the housing assembly process, the side plate-defining section of metal is bent upwardly so as to define the side plate. Housing 21 also includes a cover 35 (FIG. 1) that is disposed over chassis 28 and the internal components of the control console 20.

Figure 4:
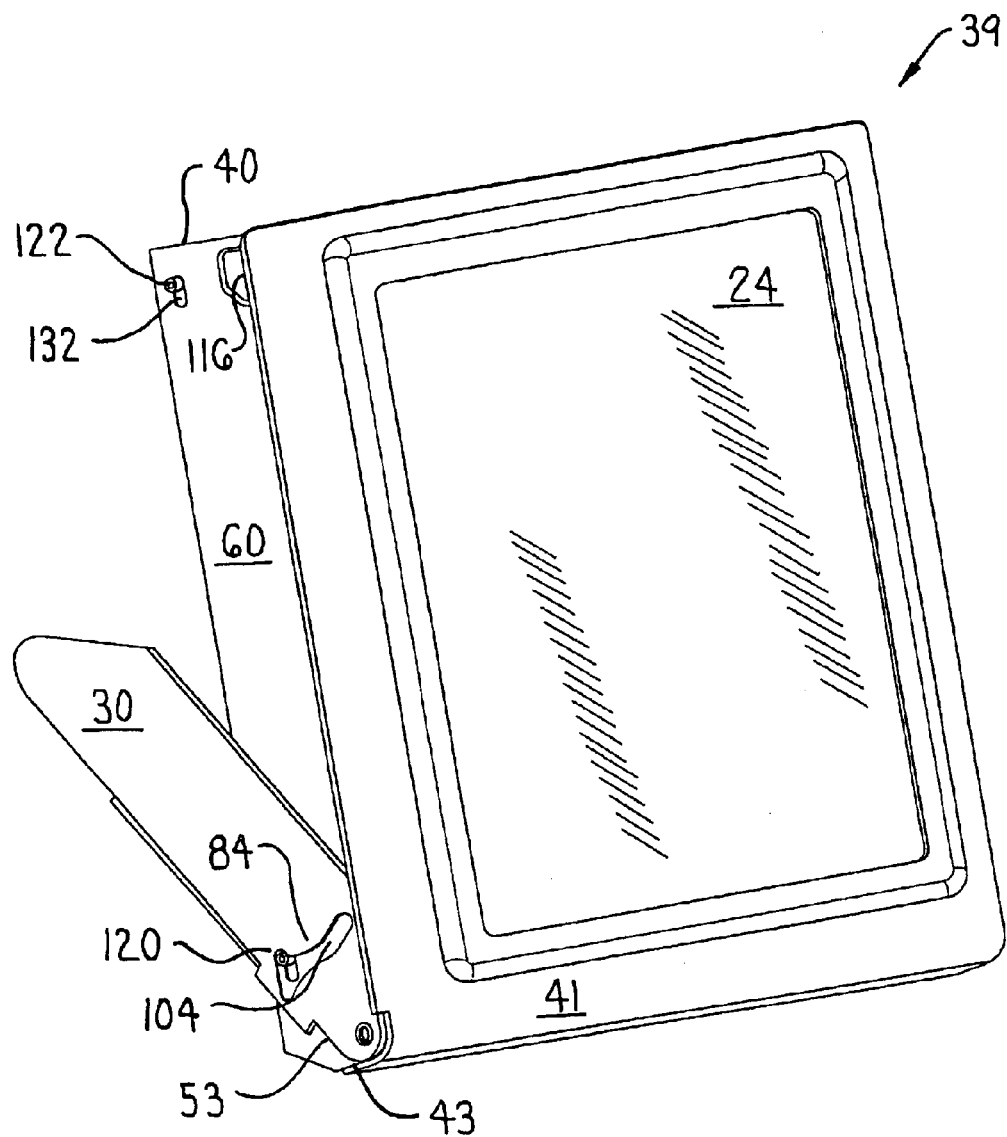
FIG. 4 is a perspective view depicting the touch screen subassembly and how the assembly is pivotally mounted to an adjacent hinge of the housing.

Touch screen display 24 is part of a touch screen subassembly 39, illustrated in FIG. 4. This subassembly includes an enclosure 40 which houses the touch screen display 24. The enclosure 40 is also the part of the touch screen subassembly 39 that is pivotally connected to the hinges 30 and 32. A rectangular cover plate 41 with a center opening is secured over display 24 to hold the display in the center space of the enclosure 40.

Figure 5:
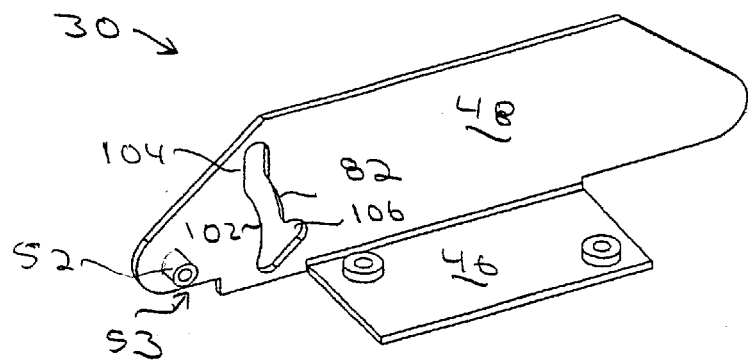
FIG. 5 is a perspective view of the hinge with locking slot of this invention.

As seen best by reference to hinge 30 depicted in FIG. 5, each hinge 30 and 32 is formed to have a rectangularly shaped base plate 46. The base plates 46 are the portions of the hinges 30 and 32 that are screw secured or otherwise secured to chassis 28. Extending perpendicularly from the base plate 46, each hinge is formed to have a side plate; plate 48 for hinge 30 and plate 50 for hinge 32. Each side plate 48 and 50 is formed with a perpendicularly extending post 52. Side plates 48 and 50 are further formed to define a small rectangular notch space 53 below the plate post 52.

Figure 6:
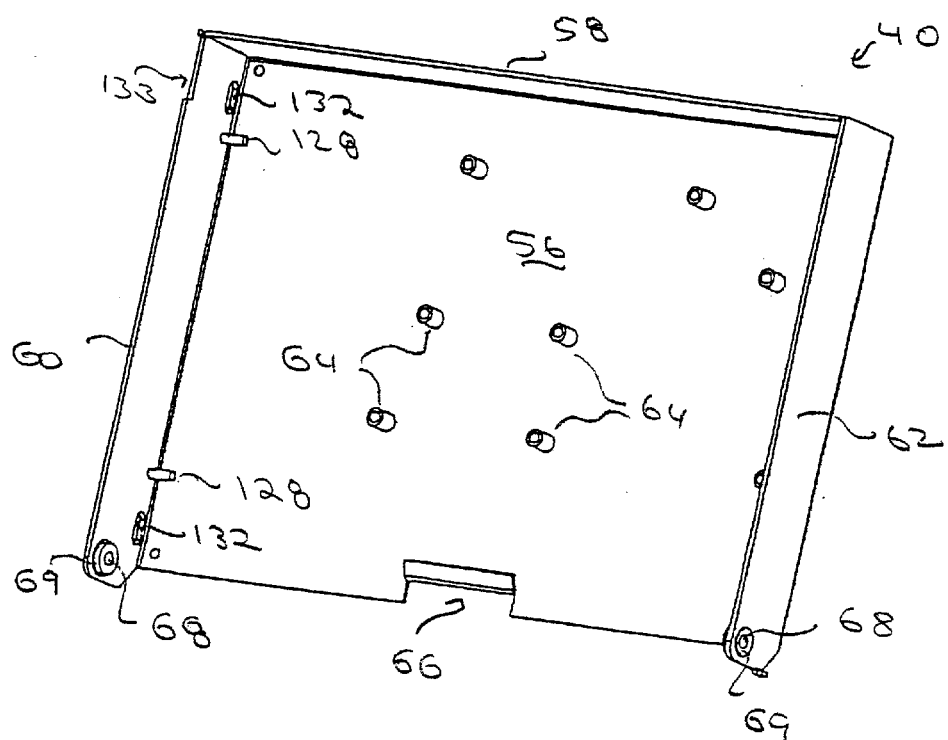
FIG. 6 is a perspective of the touch screen enclosure.

Touch screen enclosure 40, illustrated in FIG. 6, has a generally rectangular base plate 56. Top wall 58, left wall 60 and right wall 62 extend perpendicularly upwards from, respectively the top, left and right edges of base plate 56. The lower ends of left and right walls 60 and 62, respectively, extend beyond the bottom edge of base plate 56. Posts 64 extend upwardly from base plate 56. Posts 64 are formed with threaded bores, (bores not identified). The posts 64 are designed to receive fasteners used to secure printed circuit boards (not illustrated) to the enclosure 40. The printed circuit boards carry three circuits: an LCD inverter; a touch screen controller; and an LCD adapter. Collectively, these three circuits comprise the display I/O processor 25. The touch screen 26 and transducer surface circuit 27 are further secured to the printed circuit boards. The depicted base plate 56 is formed to have along the bottom edge a rectangular cutout 66. Cutout 66 functions as the opening through which the conductors from housing 21 are feed into the interior space within the enclosure 40 so that the conductors can be connected to the touch screen display 24.

Figure 7:
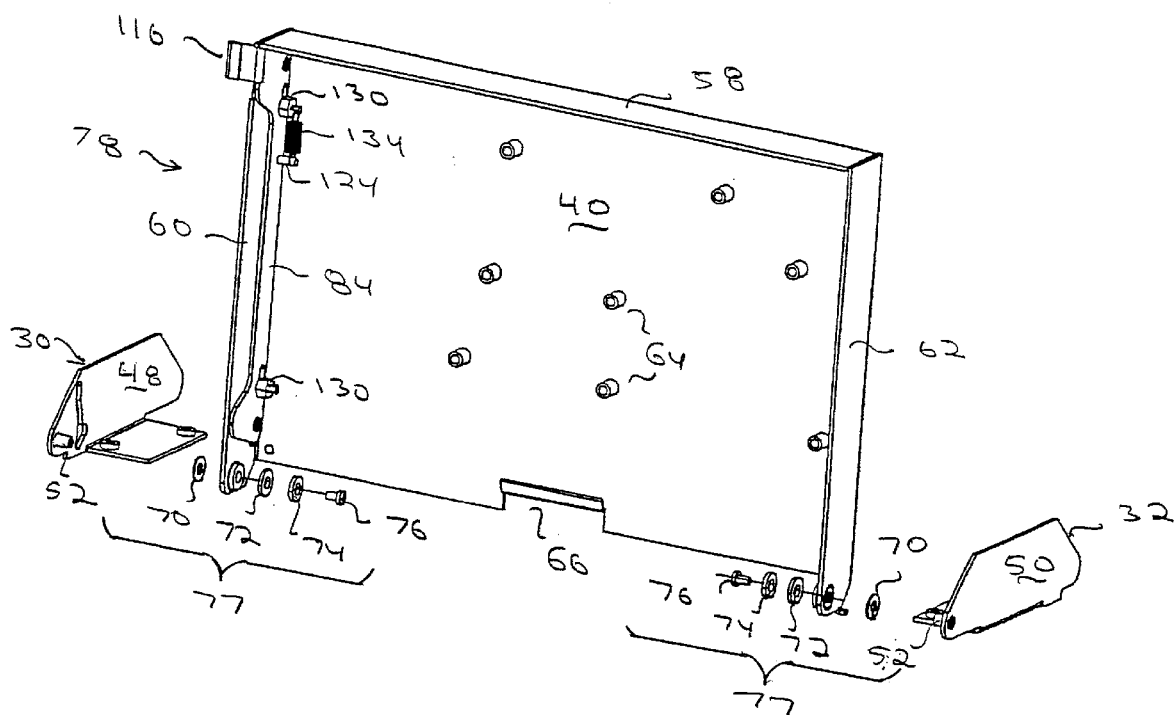
FIG. 7 is an exploded view of how the touch screen enclosure is secured to the hinges, of the brake assembly that inhibits unintentional movement of the touch screen assembly and how the lock latch is moveably secured to the touch screen enclosure.

The left and right side walls 60 and 62, respectively, are the portions of the touch screen enclosure 40 that are pivotally mounted to hinges 30 and 32. More specifically, the portion of each side wall 60 and 62 that extends beyond the bottom edge of base plate 56 is formed with an opening 68. It will further be observed that washers 69 are disposed against the inner and outer surfaces of each side wall 60 and 62 around the side wall openings 68. Washers 69 are either formed as part of the side walls 60 or 62 or are permanently secured to the side walls When the control console 20 is assembled, the enclosure side walls are fitted over the hinge posts 52; the hinge posts are thus seated in the side wall openings 68 as depicted in FIG. 7. More particularly, as part of the assembly process, a steel washer 70 is fitted over each hinge post 52 so as to be located between the associated hinge side plate 48 or 50 and the adjacent enclosure side wall 60 or 62. Within the enclosure 40, a washer 72 formed of low friction material, such as a tetrafluoethylene plastic sold under the trademark TEFLON by the Dupont Company, is fitted over the portion of the hinge post 52 that extends into through the associated enclosure wall 60 or 62. A second steel washer 74 is then fitted over the post so as to be located between the low friction washer 72 and the adjacent enclosure wall 60 or 62. A threaded fastener 76 is secured into a threaded bore in the hinge post 52 so as to hold the enclosure side wall 60 or 62 and washers 70, 72, and 74 in position.

Owing to the compressive force applied by fasteners 76, the touch screen enclosure is thus secured to the chassis so that the force applied when an individual presses against the touch screen display 24 to actuate one of its buttons is not sufficient to pivot the touch screen subassembly 39. However, due to the presence of low friction washers 72, if one intentionally places enough manually applied force on the subassembly 39 in order to move it, the enclosure 40 and the rest of the subassembly will pivot around hinge posts 52. Collectively, washers 70 72 and 74 and fastener 76 form a brake assembly 77 that prevents unintentional pivoting movement of the touch screen assembly 39.

Control console 20 of this invention also includes a lock assembly 78 that automatically locks the enclosure 40 in position when it is in either the fully inclined state or the fully up right state. In this version of the invention, it should be understood that the display 24 and enclosure 40 are in the fully upright position when these components are at a 90° from the chassis 28. The lock assembly 78, seen in FIGS. 3A, 4, 5 and 7, includes a lock plate 80 that is secured to the chassis 28, a lock slot 82 formed in the side plate 48 of left hinge 30 and a latch 84 that is moveably mounted in enclosure 40. When the touch screen subassembly 39 is fully inclined, latch 84 engages lock plate 80 to prevent the subsequent movement of the subassembly until the latch is actuated. When the touch screen subassembly 39 is in the full upright position, latch 84 seats in portions of lock slot 82 to prevent subsequent movement of the subassembly until the latch is actuated.

Figure 8:
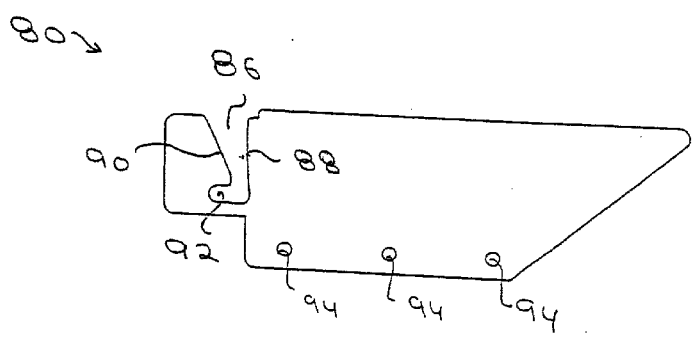
FIG. 8 is a side view of the lock plate of this invention.

Lock plate 80, seen in FIG. 8, is an elongated planar member. The plate is shaped so as to have an approximately L-shaped lock slot 86 that extends downwardly from the top of the plate. More particularly, the plate is formed to have a first edge 88 that extends perpendicularly downwardly from the top of the plate. A second edge 90, opposite first edge 88, extends downwardly from the top of the plate to further define slot 86. The plate 80 is further shaped so that slot 86 has a short longitudinally extending section 92 located along a line close to the longitudinal axis of the plate.

Lock plate 80 is secured to side plate 38 so as to be located between side plate 38 and stop plate 34. The lock plate is secured to side plate 38 so that top edges of the plates are aligned and lock slot 86 is located towards the upper end of the stop plate 34 and located above the outer surface of the stop plate. As part of this positioning of the lock plate 80 lock plate slot extending section 92 is directed towards the top of the stop plate 34. The lower portion of lock plate is formed with openings 94. Fasteners not shown, are fitted in openings 94 are complementary openings in the side plate 42 so as to facilitate the securing of the lock plate to the side plate, (fasteners and side plate openings not shown).

The left hinge lock slot, lock slot 82, is now described with reference to FIG. 5. The lock slot 82 is defined by the side plate 48 of left hinge 30 so as to have an arcuate section 102. This arcuate section is centered on an axis that extends through the associated hinge post 52. Side plate 48 is further formed so that lock slot 82 has an extension 106 that extends diagonally upwardly and rearwardly away from the lower portion of arcuate section 102. The side plate 48 is further shaped so that slot 82 has a second extension, extension 104, that extends linearly and upwardly away from the top of arcuate section 102.

Figure 9A:
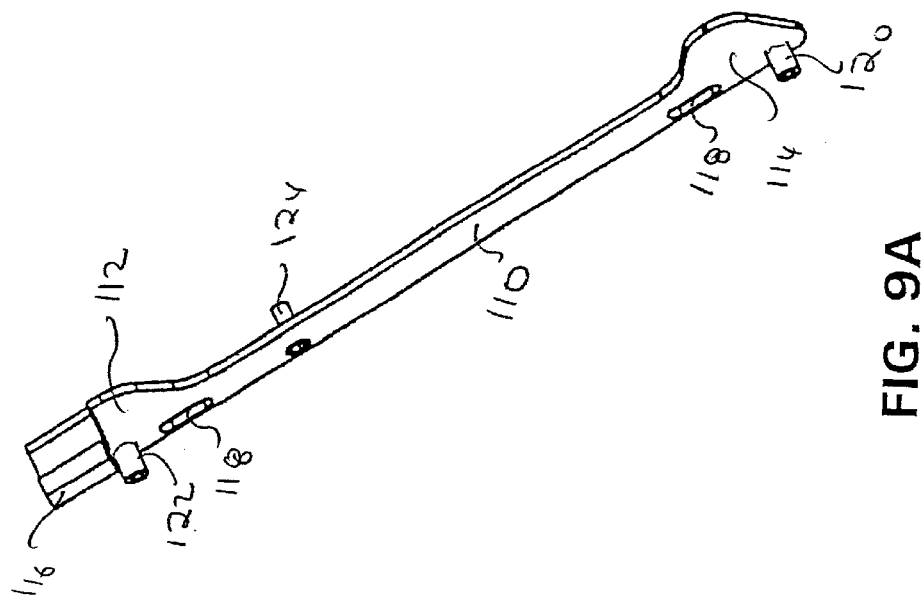
FIGS. 9A and 9B are, respectively, perspective and side views of the latch of this invention.
Figure 9B:
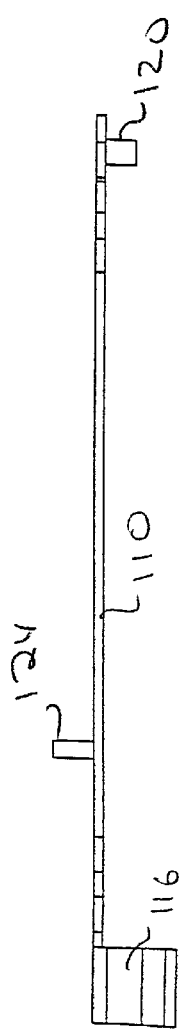

Latch 84, as seen best in FIGS. 9A and 9B, has elongated body 110. Top and bottom fingers 112 and 114, respectively, extend upwardly from, respectively, the top and bottom ends of body 110. Fingers 112 and 114 are dimensioned so as to abut against the inner surface of cover plate 41 of the touch screen subassembly 39. A release tab 116 extends perpendicularly outwardly from the top surface of top finger 112. Latch 84 is further formed so that as to define two spaced apart oval-shaped slots 118 in body. A first boss 120 extends outwardly from body 110 below bottom finger 114. A second boss 122 extends outwardly from body 110 below top finger 112. The latch 84 is further formed to have a stand off post 124 that extends away from the body 10 opposite the side from which bosses 120 and 122 extend. Post 124 is located between slots 118 and closer to the slot 118 located closest to the top end of the body 110.

Latch 84, as seen in FIG. 7, is slidably mounted in touch screen enclosure 40 adjacent the inner surface of enclosure left side wall 60. More specifically, the latch body is seated over two mounting posts 128 that project inwardly from the side wall 60 so that the posts extend through slots 118. Nuts 130 secured over posts 128 hold the latch 84 to the enclosure 40. When the latch is so positioned, bosses 120 and 122 extend through separate spaced apart slots 132 formed in the enclosure left side wall 60. Tab 116 extends through a cut out 133 formed along the top edge of side wall 60.

A coil tension spring 134 extends between the topmost enclosure post 128 and latch stand off post 124. Spring 134 imposes a tensile biasing force on the latch 84 so as to force the latch to move towards the top of the touch screen enclosure.

When the touch screen subassembly is moved toward the fully inclined state, boss 122 seats in lock slot 86 formed in lock plate 80. More particularly, the boss 122 bears against edge 90 so that, as the touch screen subassembly is inclined, the latch 84 is urged toward the base of the enclosure without any human intervention. When the touch screen assembly is in the fully inclined position, latch boss 122 is fully aligned with section 92 of lock slot 86. Consequently, when the touch screen subassembly is so positioned, spring 134 moves the latch forward so that boss 122 seats in the closed end of lock slot section 92. This seating of boss 122 locks the touch screen subassembly 39 in the fully inclined position.

The touch screen subassembly 39 is released from the fully inclined position by the manual downward depression of latch release tab 116. This manual displacement of the latch repositions boss 122 out of the closed end of lock slot section 92 so that the touch screen subassembly can be pivoted away from the fully inclined state.

As a result of the assembly of the control console 20, boss 120 is seated in left hinge lock slot 82, as shown in FIG. 4. When the touch screen subassembly is in the fully inclined state, boss 120 is located in the extension 106, the bottom extension, of the lock slot 82. As a result of the repositioning of the touch screen subassembly from the inclined position to the upright position, boss 120 travels through both extension 106 and arcuate section 102. It should be understood that that lock slot 102 is positioned in the left hinge 30 so that boss 120 causes latch 84 to be displaced toward the lower end of enclosure 40. Owing to this displacement of latch 84, spring 134 places a force on the latch to urge the latch towards the top end of enclosure 40.

The displacement of the touch screen subassembly 39 eventually results in its movement to the full upright position. When the subassembly is so positioned, latch boss 120 is located in the bottom portion of lock slot arcuate section 102. Thus, when the boss 120 is so positioned, the boss is aligned with lock slot extension 104. When the boss 122 is so aligned, the spring 134 imposes on latch 84 moves the latch forward. This displacement of the latch 84 relative to the enclosure results in boss 120 seating in lock slot extension 104. This seating of the boss 120 locks the touch screen subassembly 39 in the full upright position.

The touch screen subassembly 39 is unlocked from the full upright position by the downward depression of release tab 116. This manually forced displacement of the tab 116, and therefore the whole of latch 84, serves to move boss 120 out of lock slot extension 104 and back into arcuate section. This repositioning of the boss 120 unlocks the touch screen subassembly so that the subassembly can be rotated back towards the inclined position.

As seen best in FIG. 4, it can also be observed that touch screen assembly 39 cover plate 41 is formed so as to have a lip 43 that extends inwardly along the bottom of the touch screen subassembly. Lip 43 extends outwardly beyond enclosure side walls 60 and 62. When the control console 20 of this invention is assembled, the opposed ends of lip 43 seat in the cutouts 53 defined by hinge plates 48 and 50. Collectively, lip 43 and the hinge plates 48 and 50 are dimensioned so that, when the touch screen subassembly is in the full upright position, lip 43 abuts the surfaces of the hinge plates that define cutouts 53. This contact prevents a person from pivoting the touch screen subassembly 39 beyond the full upright position of the subassembly.

The control console 20 of this invention is thus constructed so that the touch screen subassembly can be positioned in a fully inclined position, an upright position and in user-selected intermediate position between these two limits. Thus, when the control console 20 is employed during a surgical procedure, the touch screen 24 can be positioned at the most optimal position to accommodate the preferences of the personnel performing the procedure. The invention is further constructed so that when the touch screen 24 is in the full inclined or full upright position, the lock assembly holds the screen in fixed position. Consequently, should the control console be moved when the touch screen is so positioned, inadvertent handling of the touch screen subassembly will not result in subassembly being pivoted and potentially broken away from the housing 21.

Still another feature of this invention is that washers 70, 72, 74 and fastener 76 collectively cooperate to hold the touch screen in an intermediate position when it is so positioned and an individual presses the touch screen to depress one of its buttons. At the same time the force imposed by washers 70, 72, 74 and fasteners 76 is not so great as to prohibit the manual resetting of position of the touch screen. Thus, only when the touch screen subassembly of this invention is in one of its two extreme positions do personnel have to remember to and take the time to actuate the latch 84 in order to reposition the touch screen 24.

Also, when the touch screen subassembly is in one of its positions in which it is locked by latch 84, the same motion, the downward depression of latch tab 116, is all that is employed to unlock the subassembly so that it can be repositioned. Thus, surgical personnel can easily learn by habit that, regardless of which of the two locked positioned the touch screen assembly is in, a single motion is all that is need to unlock the touch screen assembly for repositioning.

Thus, the control console 20 of this invention has a touch screen subassembly 39 that is easily positioned for ease of viewing and use and that is not difficult to so position. Moreover, the touch screen subassembly 39 automatically locks itself when fully inclined to prevent inadvertent and potentially destructive movement when being moved.

Figure 10:
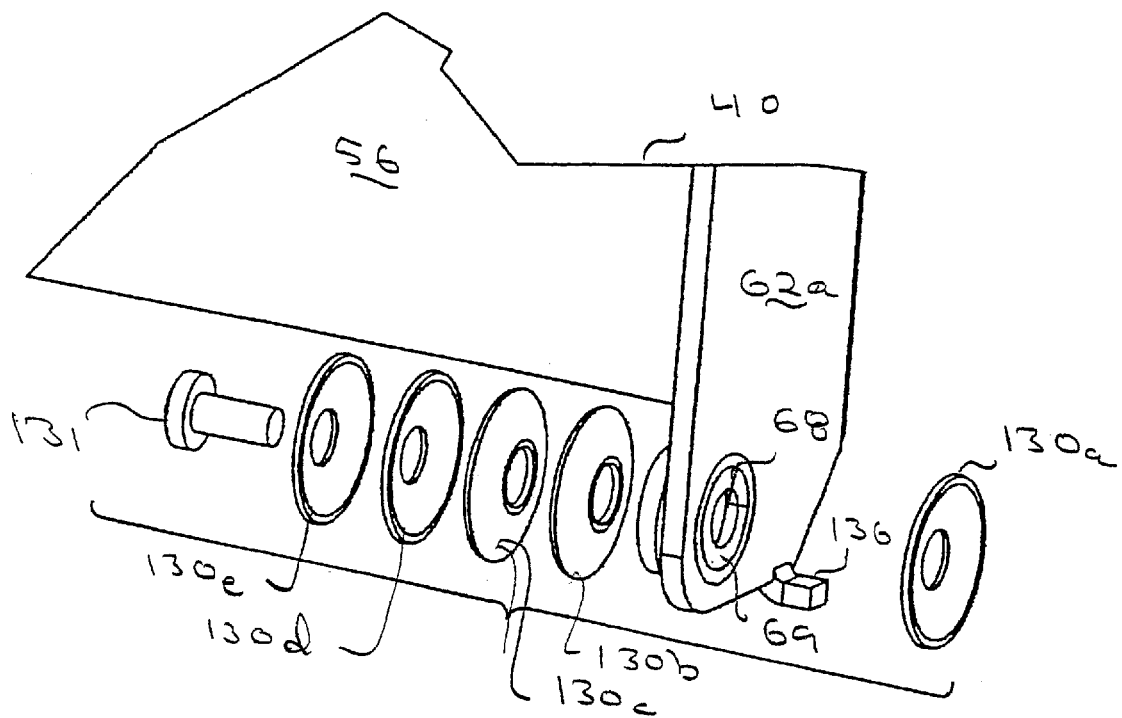
FIG. 10 is an exploded view of an alternative brake assembly for inhibiting unintended movement of the touch screen of this invention.

An alternative braking assembly for holding the touch screen subassembly of this invention in an intermediate position is now described by reference to FIG. 10. In this version of the invention, a set of Belleville washers 130, sometimes referred to as disk springs, are fitted over the hinge posts 52. Specifically, a first Belleville washer 130a is positioned between the side plate 48 or 50 and the adjacent left or right wall 60a or 62a, respectively, of the enclosure 40. (Only wall 62a shown) Washer 130a is so that its apex, its narrow diameter end is located outwardly, towards the outer surface of the adjacent side wall 62a. Within the enclosure 40, second and third Belleville washers 130b and 130c, respectively, are positioned so that their apexes are directed toward the adjacent enclosure left or right wall. Fourth and fifth Bellville washers 130d and 130e, respectively, are positioned over the post between the third washer 130c and the free end of the post. The fourth and fifth washers 130d and 130e, respectively, are oriented so that their apexes are directed toward the free end of the associated hinge post 52. A threaded fastener 131 is secured to a bore in the hinge post 52. The head of fastener 131 places a sufficient compressive force on the Belleville washers 130 that the washers impose a braking force on the movement of the enclosure that prevent its movement when the touch screen is normally depressed and that allows the movement of the enclosure 40 when a manual force is applied to this component to reset the angle of the touch screen subassembly.

In some alternative preferred versions of the invention, it may not be necessary to provide the lock assembly for fixedly holding the touch screen subassembly in either the inclined or fully upright positions. In versions of the invention wherein a lock assembly is not provided for automatically locking the assembly in the full upright assembly, one or both of the enclosure side walls may be provided with a stop tab 136 as illustrated in FIG. 10 extending outwardly from right side wall 62a. Stop tab 136 is positioned so that when the control console 20 is assembled, the tab is located below the bottom edge of the adjacent hinge side plate 48 or 50. When the touch screen subassembly is pivoted upwardly, tab 136 abuts this hinge edge surface so as to prevent further movement pivoting of the touch screen subassembly 39.

It should be understood that the foregoing are descriptions of some preferred versions of the control console of this invention and that other versions of this invention may be different from what has been described. For example, there is no requirement that each version of the control console of this invention function as a video image recorder. In other versions of this invention, the control console may function as a control console that regulates the application of energization signals to a powered surgical handpiece such as a cutting device, an ultrasonic device, a light emitting device or an electrosurgical tool. Alternatively, the control console may regulate a pump used to apply fluids to and/or draw fluids from a surgical device. In still other alternative versions of the invention the control console may be a light source that applies light to a surgical procedure or contain video signal processing equipment that process images captured by a camera so that the images may be displayed on a monitor and/or recorded.

It should likewise be recognized that the braking assembly employed to prevent pivoting of the touch screen subassembly when the touch screen 24 is depressed to actuate a button and that allows the subassembly to pivot when the subassembly is manually pushed or pulled on may vary from what has been described. For example, in some versions of the invention, the braking assembly could include one or more springs such as coil springs. The spring or springs of these versions of the invention would bear against a portion of the enclosure 40 so as to impose a braking force on the enclosure that prevents its movement when the associated touch screen 24 is normally depressed. In still other versions of the invention, the braking assembly may include one or more elastomeric members that are compressibly mounted between a fixed member integral with the chassis or hinge and the enclosure 40. In this construction of the invention, the elastomeric members provide the braking force that stops the touch screen assembly from pivoting when the touch screen 24 is normally depressed.

In one of the above-disclosed versions of the invention, a lock assembly automatically locks the touch screen subassembly in position when it is in the fully inclined or full upright positions. In another version of the above-described versions of the invention, there is no lock assembly. Alternative versions of the invention can further vary from what has been described. Thus, in some versions of the invention, a lock assembly may be provided to hold the touch screen subassembly in a fixed position when it is in a single one of the user-selected positions. In these versions of the invention, the lock assembly may be configured to hold the touch screen enclosure 40 in position when it is: fully inclined; fully upright; or in one of its intermediate positions. In still other versions of the inventions, a lock assembly may be provided that can hold the touch screen enclosure in three or more user-selected positions.

It should be understood that lock assemblies may differ in design from the disclosed lock assembly. For example, in some versions of the invention, the lock assembly may include a spring-biased pin that is mounted to the touch screen enclosure or adjacent static component of the housing. In these versions of the invention, the adjacent component, the static component of the housing or the touch screen enclosure is provided with one or more openings. As the touch screen enclosure 40 is pivoted, the pin aligns with and seats in one of the openings. The seating of the pin locks the touch screen subassembly in the given position. The touch screen subassembly is unlocked by retracting the pin out of the opening in which it is seated. Again, it should be recognized that other latch-in-opening mechanisms may be employed to hold the touch screen subassembly in one or more fixed angular assemblies relative to the associated control console housing 21. Alternatively, opposed magnets disposed in the housing 21 and touch screen enclosure 40 may form the components of a locking system that prevents movement of the touch screen subassembly when it is in one or more positions unless a release mechanism is actuated.

Moreover, the features of this invention may be integrated into system. For example, the brake and lock system of this invention may be integrated into an assembly that allows the position of the touch screen subassembly to be vertically adjustably set relative to the housing chassis. In these versions of the invention, the brake assembly may prevent the unintended pivoting of the touch screen subassembly. However, the pins to which the touch screen enclosure are pivotally mounted may be moveably mounted to the housing so that the vertical position of the touch screen may be set. Alternatively, the brake and lock assembly may be incorporated into another assembly in which the touch screen subassembly is swivel mounted to the housing 21. In some versions of the invention, a servo system may be provided to electrically set the position of the touch screen. Even in this version of the control console, it may be desirable to incorporate the brake and/or lock assembly of this invention. In the above-described versions of the invention, supplemental brake assemblies may also be provided to prevent unintentional vertical, swiveling or machine movement of the touch screen display 24.

It should similarly be understood that the disclosed hinge assembly for pivotally securing the enclosure 40 to the housing 21 is exemplary and not limiting. In other versions of the invention, the enclosure may be provided with posts that rotatably seated in complementary holes formed in fixed plates internal to the housing. In some versions of the invention, one or more hinge pins that extend between plates internal to the housing and the touch screen subassembly may function as the members that allow the pivoting movement of the touch screen subassembly.

Thus, it is an object of the appended claims to cover all modifications and variations that come within the true spirit and scope of the invention.

What is claimed is:

1. A control console comprising:
   a housing;
   an electrical circuit disposed in said housing for processing electrical signals in response to user-selected commands;
   a touch screen subassembly comprising:
      a touch screen electrically connected to said electrical circuit, said touch screen having an outer surface and configured to display images based on electrical signals received from said electrical circuit and to generate electrical signals based on manual depression of the outer surface that are transmitted to said electrical circuit as command signals; and
      an enclosure that is pivotally mounted to said housing, wherein said touch screen is secured to said enclosure; and
   a brake assembly extending between said housing and enclosure, said brake assembly configured to apply a restraining force on movement of said enclosure so that, when the touch screen surface is depressed to cause said touch screen to generate a command signal, said enclosure remains in a static position relative to said housing and, when a force greater than the force required to cause said touch screen to generate a command signal is applied to said touch screen or said enclosure, said enclosure pivots relative to said touch screen.

2. The control console of claim 1, further including a lock assembly including a first latch member attached to said housing and a second latch member attached to said enclosure, said latch members being positioned and configured to cooperate to releasably hold said enclosure in at least one fixed position relative to said housing.

3. The control console of claim 2, wherein said lock assembly is further configured to hold said enclosure in a plurality of positions relative to said housing.

4. The control console of claim 2, wherein:
   said lock assembly first latch member includes a section of said housing that defines a first lock slot;
   said lock assembly second latch member is a latch that is moveably attached to said enclosure, said latch having first and second bosses that extend toward said housing;
   said lock assembly includes a second section of said housing that defines a second lock slot; and wherein; said first lock slot is positioned so that when said enclosure is in a first position relative to said housing, said latch first boss seats in said first lock slot; and the second lock slot is positioned in the second section of said housing so that, when said enclosure is in a second position relative to said housing, said latch second boss seats in the second lock slot.

5. The control console of claim 1, wherein said brake assembly includes a member that is attached to said housing that imposes a compressive force against said enclosure.

6. The control console of claim 1, wherein said brake assembly includes a spring member that has a first end that bears against a fixed surface that is associated with said housing and a second end opposite the first end that bears against said enclosure.

7. The control console of claim 1, wherein:
said housing includes at least one hinge post; and
said enclosure is provided with an opening for receiving said hinge post.

8. A control console comprising:
a housing;
an electrical circuit disposed in said housing for processing electrical signals in response to user-selected commands;
a frame pivotally mounted to said housing so as to have first and second spaced-apart limit positions at the opposed ends of the range of pivotal movement of said frame;
a touch screen mounted to said frame to pivotally move with the pivotal movement of said frame, said touch screen being connected to said electrical circuit to exchange electrical signals with said electrical circuit and being configured to receive display signals from said electrical signals and, based on the display signals, to present a user-viewable image, said touch screen having a touch-responsive surface that is configured to, in response to depression by the finger of a user, generate command signals to said electrical circuit; and
a lock assembly, said lock assembly including:
a latch that is moveably attached to said frame, a first section of said housing that defines a first slot, wherein said housing first section and the first lock slot are positioned so that, when said frame is in the first limit position, a portion of said latch engages in the first lock slot and the first lock slot is shaped so that release of said latch from the first lock slot is accomplished by movement of said latch relative to said frame; and
a second section of said housing that defines a second lock slot, said housing second section and the second lock slot being positioned so that, when said frame is in the second limit position, a portion of said latch engages in the second lock slot and the second lock slot is shaped so that release of said latch is accomplished by movement of the said latch relative to said frame; and
a brake assembly attached to said housing, said brake assembly having a brake member that bears against said frame to impose a braking force against said frame, said braking force being such that when said frame is in an intermediate pivoted position between said first and second limit positions and a finger is depressed against the touch screen surface to cause the generation of a command signal, the braking force prevents movement of the frame, and a force greater than the depression of a finger against the touch screen surface can be applied to said frame to pivot said frame.

9. The control console of claim 8, wherein: said latch is provided with two separate spaced apart locking members; a first one of said locking members is positioned to engage the first lock slot of said first section of said housing; a second one of said locking members is positioned to engage the second the second lock slot of said second section of said housing; and the lock slots are shaped so that movement of said latch in a single direction releases said first locking member from the first lock slot when said first locking member is so engaged and releases said second locking member from the second lock slot when said second locking member is so engaged.

10. The control console of claim 9, further including a biasing device extending between said latch and said frame for releasably holding said latch in a locked position.

11. The control console of claim 8, further including a biasing device extending between said latch and said frame for releasably holding said latch in a locked position.

12. The control console of claim 8, wherein:
said housing has at least one hinge;
said frame is pivotally attached to said at least one hinge; and
said brake assembly includes at least one first member that is attached to said hinge that is disposed against said frame and a second member that is mounted to said hinge that bears against said first member so that said first member imposes a braking force on said frame.

13. The control console of claim 12, wherein said first member of said brake assembly is non-metallic washer.

14. The control console of claim 12, wherein said first member of said brake assembly is a compressible washer.

15. The control console of claim 12, wherein:
said hinge has a post;
said frame is formed with an opening in which said post is seated so that said frame pivots around said post; and
said brake assembly first member is mounted to said post to bear against said frame.

16. The control console of claim 8, wherein:
said housing is formed with at least one post; and
said frame is formed with an opening in which said post is seated so that said frame pivots around said post.

17. A control console comprising:
a housing;
an electrical circuit disposed in said housing for processing electrical signals in response to user-selected commands;
a frame pivotally mounted to said housing so as to have first and second spaced-apart limit positions at the opposed ends of the range of pivotal movement of said frame;
a touch screen mounted to said frame to pivotally move with the pivotal movement of said frame, said touch screen being connected to said electrical circuit to exchange electrical signals with said electrical circuit and being configured to receive display signals from said electrical signals and, based on the display signals, to present a user-viewable image, said touch screen having a touch-responsive surface that is configured to, in response to depression by the finger of a user, generate command signals to said electrical circuit; and
a lock assembly, said lock assembly including:
a latch that is moveably attached to one of said housing or frame and that is directed to the other of said frame or said housing;

at least one opening formed in one of said frame or said housing that is positioned so that when said frame is in a select angular position relative to said housing, said latch is aligned with said opening;

a biasing device extending between said latch and said housing or frame for urging said latch into said at least one opening; and a release member attached to said latch for retracting said latch away from said opening; and a brake assembly attached to said housing, said brake assembly having a brake member that bears against said frame to impose a braking force against said frame, said braking force being such that when said frame is in an intermediate pivoted position between said first and second limit positions and a finger is depressed against the touch screen surface to cause the generation of a command signal, the braking force prevents movement of the frame, and a force greater than the depression of a finger against the touch screen surface can be applied to said frame to pivot said frame.

18. The control console of claim 17, wherein:

said frame or said housing is formed with a plurality of spaced apart openings that are positioned so that, as said frame is pivoted, said latch aligns with each said opening.

19. The control console of claim 18, wherein said latch is formed with a first boss that is positioned to align and seat in a first one of the openings and a second boss that is positioned to align and seat in a second one of said openings.

20. The control console of claim 17, wherein:

said housing is formed with at least one post; and said frame is formed with an opening in which said post is seated so that said frame pivots around said post.

* * * * *